Jan. 17, 1939.    J. W. LEIGHTON    2,144,162
TIE ROD CONNECTION
Filed June 12, 1936
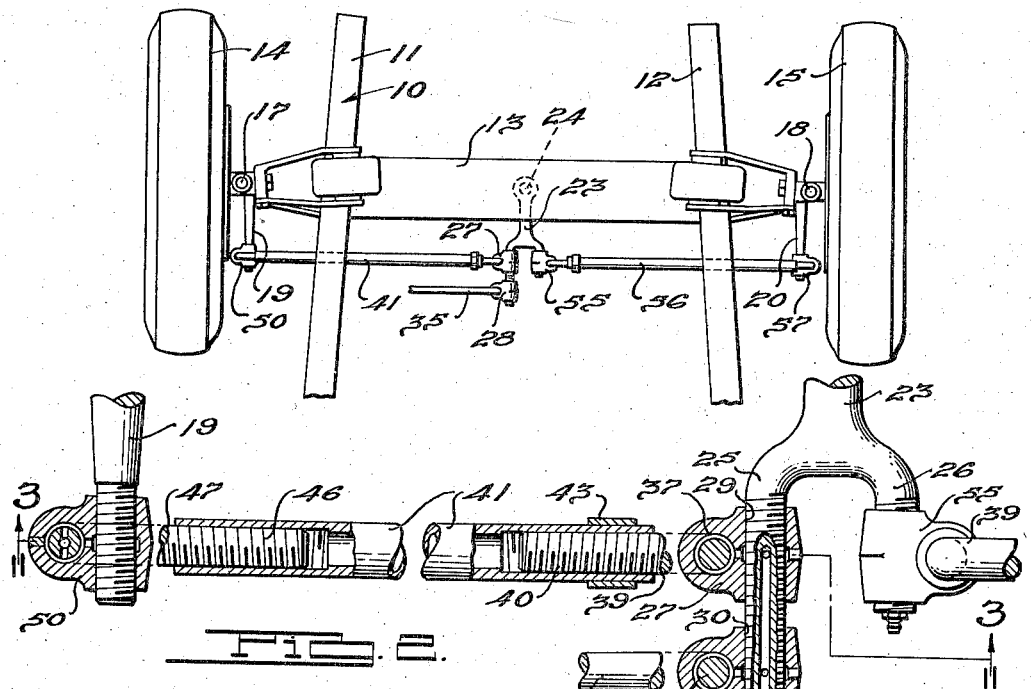
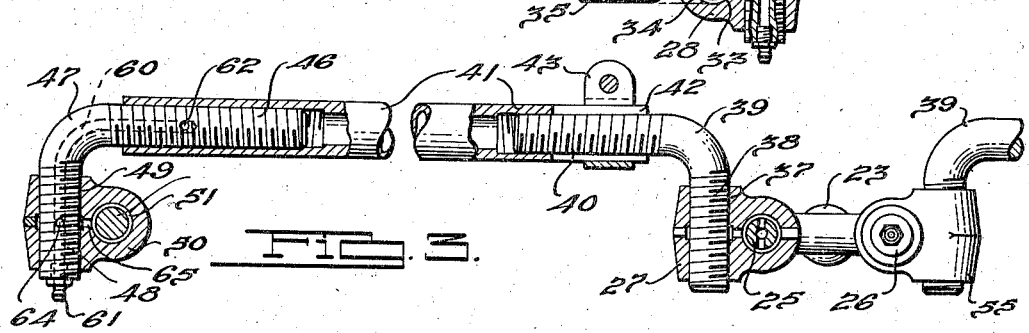
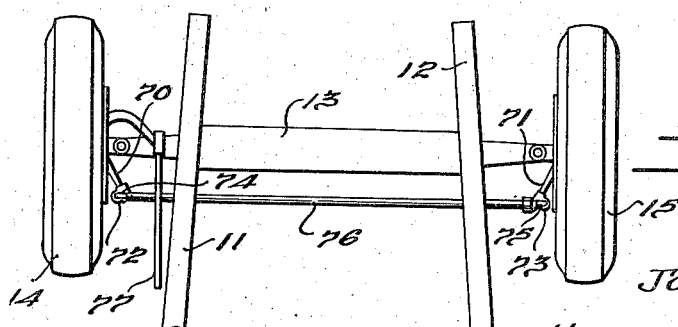
INVENTOR
John W. Leighton
BY
Harness, Dickey, Pierce & Hann.
ATTORNEYS.

Patented Jan. 17, 1939

2,144,162

UNITED STATES PATENT OFFICE 2,144,162

TIE ROD CONNECTION

John W. Leighton, Port Huron, Mich.

Application June 12, 1936, Serial No. 84,818

5 Claims. (Cl. 280—95)

The invention relates generally to automobiles and it has particular relation to tie rod assemblies forming a part of the steering mechanism.

One object of the invention is to provide an improved tie rod arrangement which is more efficient and durable.

Another object of the invention is to provide an improved tie rod arrangement which employs threaded bearings.

Another object of the invention is to provide an improved tie rod arrangement employing threaded bearings, wherein provision is made for permitting requisite universal movement at different points and adjustments at different points.

Another object of the invention is to provide an improved tie rod arrangement employing threaded bearings, which is particularly adapted for use in connection with individual suspension wheels.

Another object of the invention is to provide an improved tie rod arrangement which is particularly adapted for use in automobiles having the conventional, rigid axle construction.

Other objects of the invention will become apparent from the following description, the specification relating thereto, and from the claims hereinafter set forth.

For a better understanding of the invention, reference may be had to the drawing, wherein:

Figure 1 is a fragmentary plan view of the front end of an automobile having individually sprung wheels, wherein one form of the invention is employed;

Figure 2 is a detailed view, partly in cross section, illustrating a major portion of the tie rod assembly shown in Figure 1;

Figure 3 is an elevational view, partly in cross section, of the assembly shown by Figure 2; and Figure 4 is a fragmentary plan view, similar to Figure 1, showing an automobile having a rigid axle connecting the front wheels, wherein another form of the invention is employed.

Referring to Figure 1, the chassis frame of the automobile is indicated generally at 10 and includes side members 11 and 12 and a cross frame member 13. The front wheels of the automobile are indicated at 14 and 15 and each wheel is individually sprung. While different forms of individual suspensions may be used, in the construction illustrated it is contemplated using upper and lower arms at each side of the automobile which are pivotally connected to the frame and to the knuckle brackets or kingpin assemblies of the wheel, so as to permit vertical hinging movement of the wheel with respect to the frame.

Inasmuch as the present invention is concerned only with the steering arrangement, further reference to details of the invention will not be made except to identify the kingpin at each side, and these are indicated at 17 and 18. As will be readily understood, rigid arms 19 and 20 project rearwardly from the wheels or kingpin, from which it follows than when either of the arms 19 or 20 is turned, the wheel adjacent thereto will be turned likewise.

For turning the arms 19 and 20, and hence turning the wheels, an arrangement is provided which includes an arm 23 located substantially midway between the wheels and which is pivoted on the frame member 13 by means of a vertically disposed pivot pin 24. Preferably, the pin 24 is threaded and the arm 23 has a threaded aperture threadedly receiving the pin, so that lateral oscillatory movements of the arm occur about a threaded bearing. As best shown by Figure 2, the arm 23 terminates rearwardly in a bifurcated portion, providing spaced arms 25 and 26. Arm 25 is substantially longer than the arm 26 and is externally threaded for receiving a pair of blocks 27 and 28, having threaded openings 29 and 30 for receiving the arm. The block 28 has a vertically disposed threaded opening 33 located in offset relation to the opening 30, and this threaded opening threadedly receives a turned-down end portion 34 of a rod 35, which may be suitably connected to the crank arm on the steering post in such manner that upon turning the steering wheel, the arm 35 moves the arm 23 laterally about its pivotal connection 24.

The block 27 has a threaded opening 37 similar to the opening 33 and, as best shown by Figure 3, this opening receives the turned-down threaded end 38 of an angular pin 39. The other end of the pin 39 is disposed substantially horizontally and is threaded, as indicated at 40, into one end of a tubular tie rod 41. That portion of the tie rod threadably receiving the end 40 of the pin is longitudinally slotted, as indicated at 42, and clamping means 43 surrounds the slotted portion of the tie rod, from which it follows that the end of the tie rod may be clamped into non-rotatable locking engagement with the threaded end of the pin.

The other end of the tie rod 41 threadably receives a threaded end 46 of a second angular pin 47, but in this case a pivotal bearing is provided allowing relative turning movement of the tie rod and the threaded end of the pin. Pin 47 has a downwardly projecting threaded end 48 that is threaded into a vertically disposed opening 49 of a third block 50 and this block has a threaded opening 51, similar to the other openings mentioned, which receives the threaded end of the rigid arm 19 extending to the wheel 14.

The connections between the arm 26 and the rigid arm 20 for turning wheel 15 are the same as the connections above described between the arm 25 and the arm 19. In general, and as shown by Figure 1, the block on the arm 26 is indicated at 55, the tubular tie rod at 56, and the block on the arm 20 at 57. It will be understood that the inner end of the tie rod 56 similarly has a slotted end provided with a clamp and that its other end has a pivotal, threaded bearing with the pin projecting from the block 57.

For lubricating the connection, and referring to the left hand connection shown in Figure 3, the angular pin 47 has a central, longitudinal bore indicated at 60, which extends into the end 46 of the pin and which at the outer end of the portion 43 has a grease fitting connected thereto, as indicated at 61. Radial openings 62 communicate with this bore within the end of the tie rod and extend to the threaded surface of the pin so that lubricant may be forced between the threaded bearing surfaces. Block 50 similarly has radial openings 64 that communicate with the bore 60 and these openings extend to the threaded bearing surface. A radial opening 65 is also provided in the block 50 between the threaded openings 49 and 51, so as to allow lubricant also to enter between the threaded bearing surfaces on the threaded end of the arm 19 and the block.

The threaded bearings between the blocks 27 and 28 and the pin 25 and between the blocks and the ends of the pin 39 and steering rod 35 similarly are lubricated by providing bores and intercommunicating openings. It will be understood, of course, that the connections between the arm 26 and the rigid arm 20 similarly are lubricated.

It will now be appreciated that during upward and downward movement of either wheel, the blocks will readily permit the vertical, pivotal movement required. During any steering movement, when the arm 23 is turned laterally, the connections between the tie rods and the blocks 50 and 57 readily permit the necessary horizontal pivotal movement required between the rigid arms 19 and 20 and the arm 23. Additionally, as either wheel turns and, for example, the wheel 14, it will be appreciated that the rigid arm 19 will not turn in a truly horizontal plane, because the kingpin has a certain caster angle and therefore the plane of movement of the arm 19 will be somewhat inclined. Therefore, since the pivotal movement of the arm 19 as the wheel turns is not in the same plane as the horizontal pivotal movement of the arm 23, the connections must permit or accommodate this variation. This is permitted by pivotal bearing between tie rod and the end 46 of the pin 47 which may turn therein.

The entire arrangement, operating cooperatively, permits any kind of movement required to steer the vehicle at any time regardless of the vertical movement of the wheels, or variations in the movement of one wheel with respect to the other. In other words, the arrangement permits universal movement wherever required.

In the construction shown by Figure 4, a rigid axle is provided, and the wheels similarly have rearwardly projecting, rigid arms, indicated at 70 and 71. Blocks 72 and 73 are threadably mounted on the outer ends of the arms 70 and 71, respectively, and each of these blocks is identical to the block 50 previously described in connection with the arms 19 and 20. Angular pins 74 and 75, threadably engage the blocks 72 and 73, and these pins are identical to the pin 47 previously described and cooperate with the blocks in the same manner the pin 47 cooperates with the block 50. The horizontal and threaded portions of the pins 74 and 75 are threaded into opposite ends of a tubular tie rod 76, and the tie rod is adjustably clamped on the horizontal portion of the pin 75, while the opposite end of the tie rod is rotatable on the horizontal portion of pin 74. Steering movement may be imparted to one wheel through a conventional steering rod arrangement, indicated at 77, and it will be appreciated that both wheels will be turned through the tie rod connection.

Generally, the invention provides a highly satisfactory steering assembly, provides the necessary freedom of movement wherever required while still obtaining the advantages of threaded bearings at each pivotal point. It will be further appreciated that once the assembly is made, none of the parts can become separated, as only a limited turning movement is permitted at any point of connection. Furthermore, it will be appreciated that adjustments can be made at any point without interfering with the threaded bearing operation.

Although more than one form of the invention has been illustrated and described in detail, it will be apparent to those skilled in the art that various modifications may be made without departing from the scope of the appended claims.

What is claimed is:

1. In combination, a pair of steerable wheels, arms projecting from the wheels and having threaded ends, an element threadedly pivoted on the threaded end of each arm and having a threaded opening the axis of which is angled to the axis of the arm, an angled pin having opposed ends threaded and one end of which is pivotally threaded into the threaded opening in the element, and tubular tie rod means having internally threaded ends threaded on the opposite ends of the pins respectively for connecting said elements.

2. In combination, a pair of steerable wheels, arms projecting from the wheels and having threaded ends, a tubular tie rod having internally threaded ends, an element pivotally threaded on one of the arms and having a threaded opening, a second element pivotally threaded in said opening and threaded in one end of the tie rod, with said threaded end of the arm, the opening in the first mentioned element and the tie rod end disposed at angles to each other, means including a threaded element threaded into the opposite end of the tie rod for connecting such end to the other arm, and means adjustably clamping one end of the tie rod about the element threaded thereinto, the other end of the tie rod having a threaded pivotal bearing engagement with the element threaded thereinto, whereby the tie rod and one element threaded thereinto may relatively turn during the steering operation.

3. In combination, a steering wheel arm, a second pivoted arm spaced therefrom, a tie rod having threaded ends and extending between the arms, threaded elements connecting one arm to one end of the tie rod to provide three threaded bearings having axes directed at angles to each other, and threaded elements connecting the other end of the tie rod to the other arm to provide two threaded bearings having axes directed at angles to each other and at an angle to the end of the tie rod, one of the latter elements being adjustably clamped to the end of the tie rod.

4. In combination, a frame, steerable wheels at opposite sides of frame and having arms provided with threaded ends, a central laterally swingable arm on the frame and having bifurcated, threaded portions, a joint element on each arm and having threaded bearing engagement with the threaded end thereof, a second joint element having threaded bearing engagement with the first joint element but with the axes of the two bearings at angles to each other, similarly related joint elements on each of the bifurcated portions of the center arm, a tie rod with threaded connections between said second joint element on each wheel arm and the corresponding adjacent joint element of the center arm, one of the threaded connections at the ends of the tie rod being of pivotal bearing character whereby the second joint elements may turn relatively about the axis of the tie rod.

5. In combination, a frame, steerable wheels at opposite sides of frame and having arms provided with threaded ends, a central laterally swingable arm on the frame and having bifurcated threaded portions, a joint element on each arm and having threaded bearing engagement with the threaded end thereof, a second joint element having threaded bearing engagement with the first joint element but with the axes of the two bearings at angles to each other, similarly related joint elements on each of the bifurcated portions of the center arm, a tubular tie rod between the joint on each wheel arm and the adjacent joint on the center arm and having internal threads on its ends, and threads on the second joint elements engaging the threads on the ends of the rod, one of the threaded connections at the ends of the tie rod being of pivotal bearing character, whereby the second joint elements may turn relatively about the axis of the tie rod.

JOHN W. LEIGHTON.